US012683467B2

(12) United States Patent
Kajimoto et al.

(10) Patent No.: US 12,683,467 B2
(45) Date of Patent: Jul. 14, 2026

(54) MESH FILTER IN STATOR COOLING SYSTEM

(71) Applicant: TOYOTA JIDOSHA KABUSHIKI KAISHA, Toyota (JP)

(72) Inventors: Shogo Kajimoto, Toyota (JP); Hiroaki Urano, Miyoshi (JP); Kentaro Yoshioka, Toyota (JP); Yukio Tsuchiya, Toyota (JP); Yuta Narisawa, Toyota (JP); Yutaro Ikeda, Toyota (JP); Hideki Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 18/500,626

(22) Filed: Nov. 2, 2023

(65) Prior Publication Data

US 2024/0162787 A1 May 16, 2024

(30) Foreign Application Priority Data

Nov. 10, 2022 (JP) ................................. 2022-180240

(51) Int. Cl.
*H02K 1/20* (2006.01)
*H02K 9/19* (2006.01)
*H02K 9/26* (2006.01)

(52) U.S. Cl.
CPC ................. *H02K 9/26* (2013.01); *H02K 1/20* (2013.01); *H02K 9/19* (2013.01)

(58) Field of Classification Search
CPC ............ H02K 9/26; H02K 9/19; H02K 9/193; H02K 9/197; H02K 9/20; H02K 1/20
See application file for complete search history.

(56) References Cited

U.S. PATENT DOCUMENTS

| | | | |
|---|---|---|---|
| 11,125,315 B2 | 9/2021 | Graves et al. | |
| 2010/0052441 A1 | 3/2010 | Fukushima | |
| 2019/0006914 A1* | 1/2019 | Graves ................... | F16H 57/046 |
| 2022/0190683 A1* | 6/2022 | Shirai .................... | H02K 5/203 |

FOREIGN PATENT DOCUMENTS

| | | | |
|---|---|---|---|
| CN | 210964270 U | * | 7/2020 |
| JP | 2010-057261 A | | 3/2010 |
| JP | 2011-015576 A | | 1/2011 |
| JP | 2014-87123 A | | 5/2014 |
| JP | 2014087123 A | * | 5/2014 |

OTHER PUBLICATIONS

CN-210964270-U translation (Year: 2020).*
JP2014087123A translation (Year: 2014).*

* cited by examiner

*Primary Examiner* — Oluseye Iwarere
*Assistant Examiner* — Nicholas Lee Setzer
(74) *Attorney, Agent, or Firm* — Oliff PLC

(57) ABSTRACT

A motor may include a rotor; a stator comprising a stator core and a coil; a housing that houses the rotor and the stator; and a first annular member that provides a seal between a first end face of the stator core in an axial direction of the stator core and an inner wall surface of the housing. The first annular member may include a plurality of first holes through which refrigerant is injected toward a first coil end of the coil protruding from the first end face of the stator core. At least one of the plurality of first holes may be covered with at least one mesh filter.

11 Claims, 11 Drawing Sheets

21

50c1

MESH FILTER IN STATOR COOLING SYSTEM

REFERENCE TO RELATED APPLICATIONS

This application claims priority from Japanese Patent Application No. 2022-180240 filed on Nov. 10, 2022. The entire content of the priority application is incorporated herein by reference.

BACKGROUND ART

The technology disclosed herein relates to motors.

In a motor described in U.S. patent Ser. No. 11/125,315, a stator is housed in a housing. A plurality of injection holes is formed in an annular member that provides a seal between an axial end face of a stator core and an inner surface of the housing. Refrigerant is injected toward a coil end through each of the injection holes.

DESCRIPTION

Refrigerant may contain foreign matters and these foreign matters may be injected toward a coil end from injection holes. Due to the foreign matters, an insulation failure such as short-circuit may occur at the coil end.

A motor disclosed herein may comprise a rotor; a stator comprising a stator core and a coil; a housing that houses the rotor and the stator; and a first annular member that provides a seal between a first end face of the stator core in an axial direction of the stator core and an inner wall surface of the housing. The first annular member may comprise a plurality of first holes through which refrigerant is injected toward a first coil end of the coil protruding from the first end face of the stator core. At least one of the plurality of first holes may be covered with at least one mesh filter.

The refrigerant may comprise various types of refrigerants. For example, the refrigerant may be cooling oil. Alternatively, the refrigerant may be a liquid such as water or a gaseous fluid. In the configuration above, foreign matters in the refrigerant can be captured by the at least one mesh filter. It is thus possible to prevent the foreign matters from reaching the coil end. Therefore, it is possible to suppress the occurrence of insulation failure due to foreign matters at the coil end.

BRIEF DESCRIPTION OF THE DRAWINGS

FIG. 10 is a top view of a mesh filter 23a.

Figure 1:
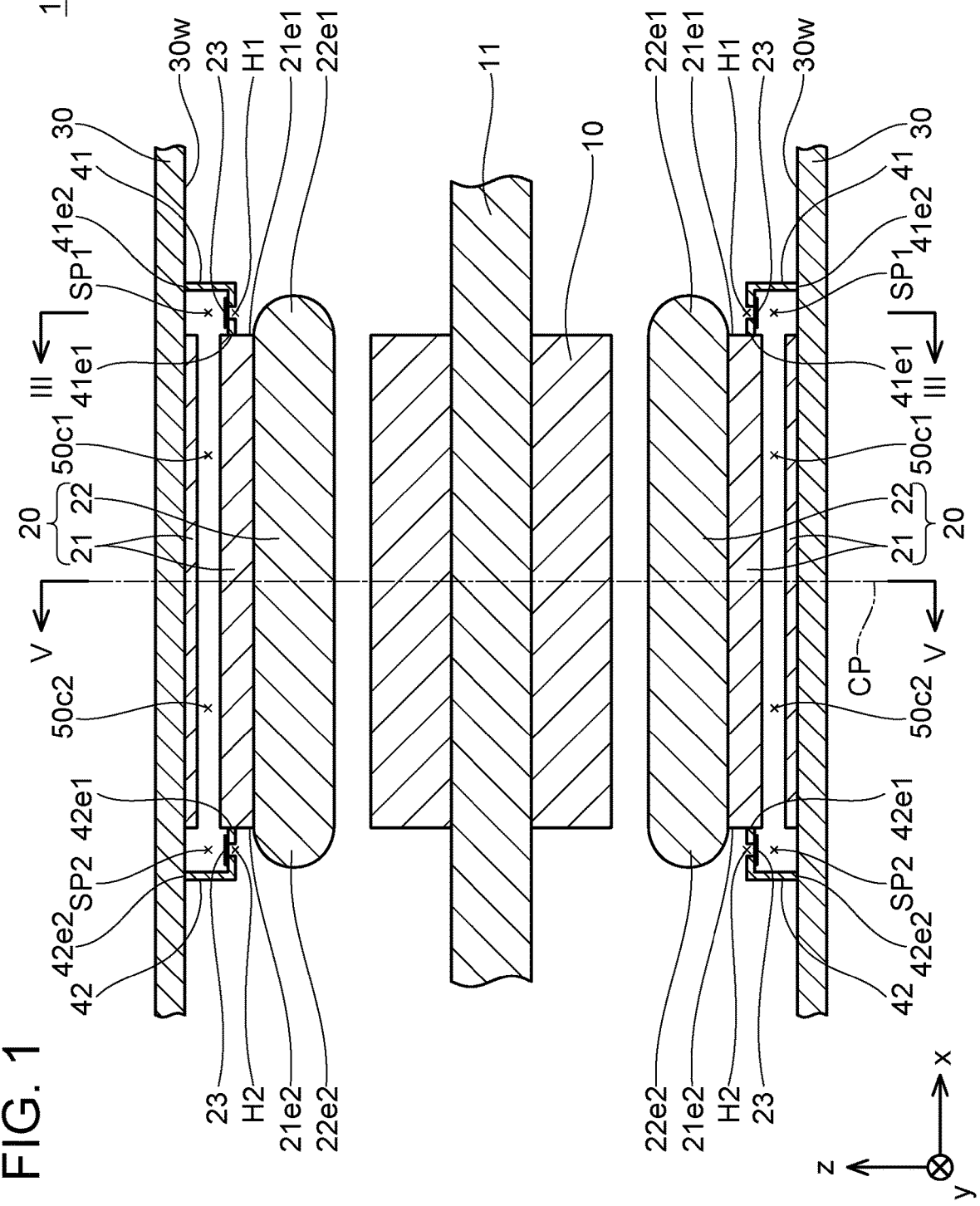
FIG. 1 is a schematic cross-sectional view of a motor 1.

The at least one mesh filter may comprise a plurality of mesh filters, and each of the plurality of mesh filters may cover a corresponding one of the plurality of first holes.

According to the configuration above, each of the plurality of first holes is covered with a corresponding one of the plurality of mesh filters. Thus, foreign matters can be appropriately captured.

The first annular member may comprise an outer circumferential surface facing the inner wall surface of the housing. Each mesh filter may comprise a first region covering the first hole; and a second region adjacent to the first region and in contact with the outer circumferential surface of the first annular member.

In the configuration above, foreign matters can be captured by the first region, and the mesh filter can be secured to the first annular member by the second region.

The first annular member may include a resin. The second region of the mesh filter may include a welded portion welded to the outer circumferential surface of the first annular member.

In the configuration above, the mesh filter can be surely secured to the first annular member by the second region.

The first annular member may have a cylindrical shape about an axis of the stator core and include an outer circumferential surface facing the inner wall surface of the housing. The at least one mesh filter may include an annular mesh filter covering the plurality of the first holes and extending along the outer circumferential surface of the first annular member.

According to the configuration above, the plurality of first holes is covered with a single annular mesh filter. This allows for simplification of mesh filter structure.

The annular mesh filter may be constituted of a metal, and expandable and contractible in a radial direction of the annular mesh filter.

This configuration allows to arrange the annular mesh filter along the outer circumferential surface of the first annular member.

The first annular member may include a resin. The annular mesh filter may comprise a welded portion welded to the outer circumferential surface of the first annular member.

In the configuration above, the annular mesh filter can be surely secured to the first annular member.

The coil may comprise a coil wire, and an outer surface of the coil wire may be coated with an insulating film. An average diameter of pores formed in the at least one mesh filter may be smaller than an average thickness of the insulating film.

The configuration above allows only foreign matters that have diameters smaller than the average thickness of the insulating film to pass through the at least one mesh filter. Thus, even if the insulating film is physically damaged by the foreign matters, it is possible to prevent the foreign matters from penetrating the insulating film and reaching a conductor. Therefore, the occurrence of an insulation failure due to the foreign matters can be suppressed.

The coil may comprise a plurality of segment coils, and outer surfaces of the segment coils may be coated with insulating films. At the first coil end, ends of the plurality of segment coils may be each exposed from the insulating films. An average diameter of pores formed in the at least one mesh filter may be smaller than a minimum distance between the ends of the plurality of segment coils.

If an end of a segment coil contacts an end of another segment coil via a foreign matter, short-circuit may thereby occur. The configuration above allows only foreign matters that have diameters smaller than the minimum distance between the ends of segment coils to pass through the at least one mesh filter. Therefore, the occurrence of an insulation failure due to foreign matters can be suppressed.

The at least one mesh filter may include a first mesh filter in which an average diameter of pores is a first average pore diameter and a second mesh filter in which an average diameter of pores is a second average pore diameter. The first average pore diameter may be larger than the second average pore diameter.

In the configuration above, the resistance of the first mesh filter is lower than the resistance of the second mesh filter. This allows an injection amount of the refrigerant to be appropriately adjusted at each first hole.

The first mesh filter may be positioned below the second mesh filter in a vertical direction.

The refrigerant injected through a first hole positioned lower in the vertical direction has a larger injection component in the opposite direction to the gravity direction, as compared to the refrigerant injected through a first hole positioned above that lower first hole. Therefore, a sufficient cooling effect for the coil end may not be obtained at the lower first hole. In the configuration above, the resistance of the mesh filter positioned lower is smaller than the resistance of the mesh filter positioned above that mesh filter. Thus, a sufficient cooling effect can be obtained even at the first hole positioned lower.

The motor may further comprise a second annular member that provides a seal between a second end face of the stator core and the inner wall surface of the housing, the second end face being opposite to the first end face of the stator core in the axial direction. The second annular member may comprise a plurality of second holes through which the refrigerant is injected toward a second coil end of the coil protruding from the second end face of the stator core. At least one of the plurality of second holes may be covered with at least one mesh filter.

This configuration allows both the first and second coil ends to be appropriately cooled.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved motors.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

Configuration of Motor 1

Figure 2:
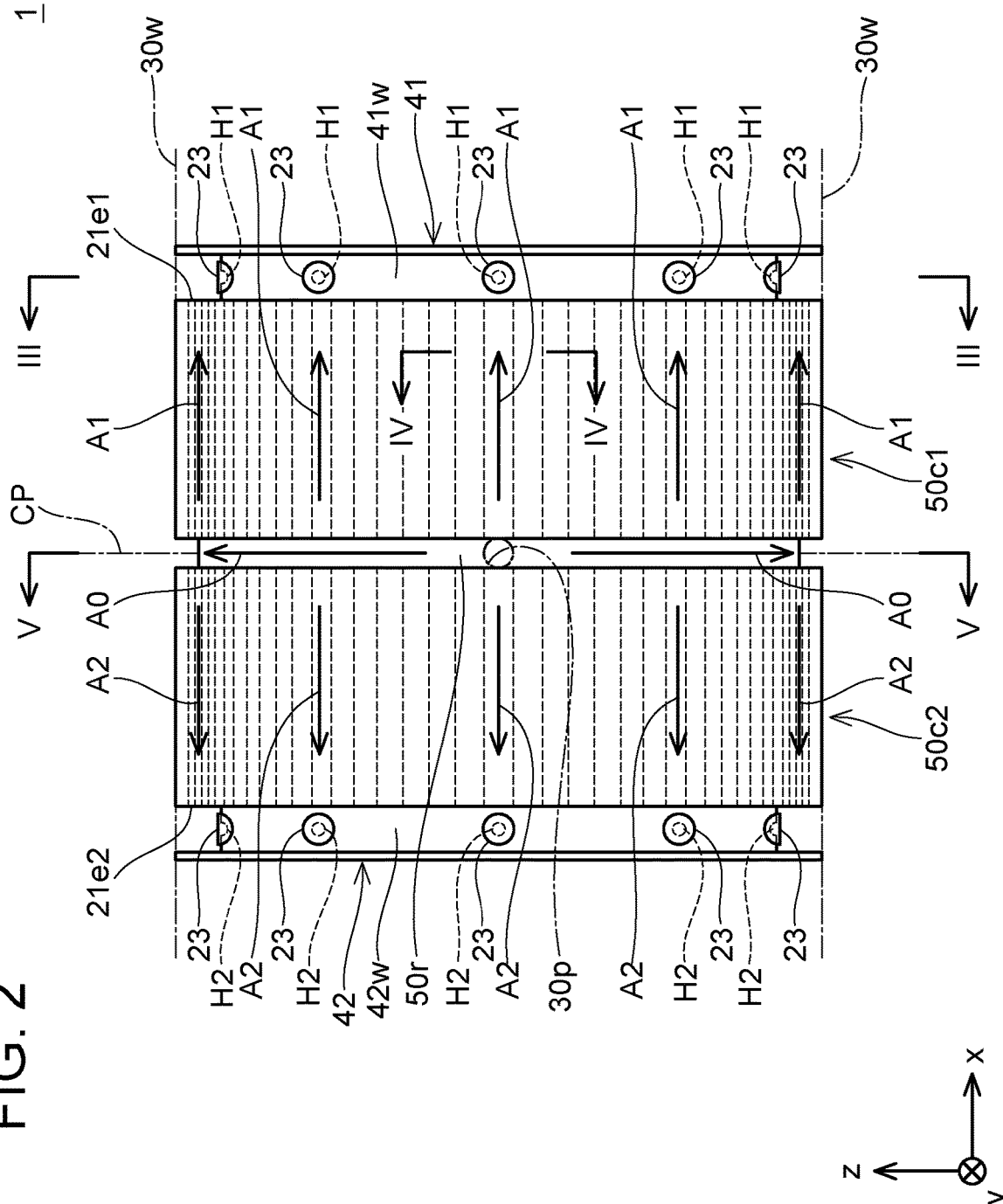
FIG. 2 is a side view of a stator 20, etc.

FIG. 1 shows a schematic cross-sectional view of a motor 1 according to an embodiment. FIG. 2 shows a side view of a stator 20, a first annular member 41, and a second annular member 42. In FIG. 2, depictions of a housing 30, a rotor 10, and a rotation shaft 11 are omitted for the sake of clarity, and an inner wall surface 30w and a supply port 30p of the housing 30 are represented by imaginary lines. In FIGS. 1 and 2, z-direction is a vertical direction, and x-direction and y-direction are horizontal directions. The x-direction is a direction in which the rotation shaft 11 extends. These directions also apply to the other drawings.

The motor 1 is mounted on an electric-powered vehicle. The electric-powered vehicle comprises a hybrid vehicle and an electric vehicle. In the electric-powered vehicle, the motor 1 may be used as a traction motor that generates power for the vehicle to travel, or as a generator that generates electric power from regenerative braking power and/or excess power of an engine. In the electric-powered vehicle, the motor 1 is mounted such that −z-direction is coincident with the gravity direction.

As shown in FIG. 1, the motor 1 comprises a center plane CP perpendicular to the rotation shaft 11. The center plane CP passes the center of a stator core 21 in its axial direction. The structure of the motor 1 is symmetric with respect to the center plane CP. Thus, hereinafter, the structure on +x-direction side relative to the center plane CP is mainly described.

The motor 1 mainly comprises the rotor 10, the stator 20, the housing 30, the first annular member 41, and the second annular member 42. The rotor 10 comprises the rotation shaft 11. The rotation shaft 11 is supported by the housing 30 via a bearing (not shown) and is rotatable. The rotor 10 is fixed to the rotation shaft 11.

The stator 20 comprises the stator core 21 and a coil 22. The stator core 21 is a substantially annular member formed, for example, of a stack of steel plates. The stator core 21 includes a first end face 21e1 at one end in the axial direction (x-direction) and a second end face 21e2 at the other end in the axial direction. A wire that constitutes the coil 22 is wound around the stator core 21. A first coil end 22e1 of the coil 22 protrudes in the axial direction from the first end face 21e1. A second coil end 22e2 of the coil 22 protrudes in the axial direction from the second end face 21e2.

The housing 30 is a member that houses the rotor 10 and the stator 20. The housing 30 surrounds the stator 20. A supply hole 30p, which will be described later, is defined in a side surface of the housing 30. A cooling oil reservoir (not shown) is disposed at a bottom portion of the housing 30. Known prior art can be applied for basic configuration of the housing 30, and thus its detailed description is omitted here.

The first annular member 41 has a ring shape about the rotation shaft 11. The first annular member 41 is constituted of resin. As shown in FIG. 1, a first end portion 41e1 of the first annular member 41 is connected to the first end face 21e1 of the stator core 21. A second end portion 41e2 of the first annular member 41 is connected to an inner wall surface 30w of the housing 30. In this way, the first annular member 41 provides a seal between the first end face 21e1 and the inner wall surface 30w. A variety of features that enhance the sealability (e.g., seal groove) may be applied to the connection between the first end portion 41e1 and the first end face 21e1 and between the second end portion 41e2 and the inner wall surface 30$w$. A space SP1 is defined between the first annular member 41 and the inner wall surface 30$w$. The space SP1 has a ring shape about the rotation shaft 11. The first annular member 41 surrounds the first coil end 22$e$1. In other words, the first annular member 41 faces the first coil end 22$e$1.

Figure 3:
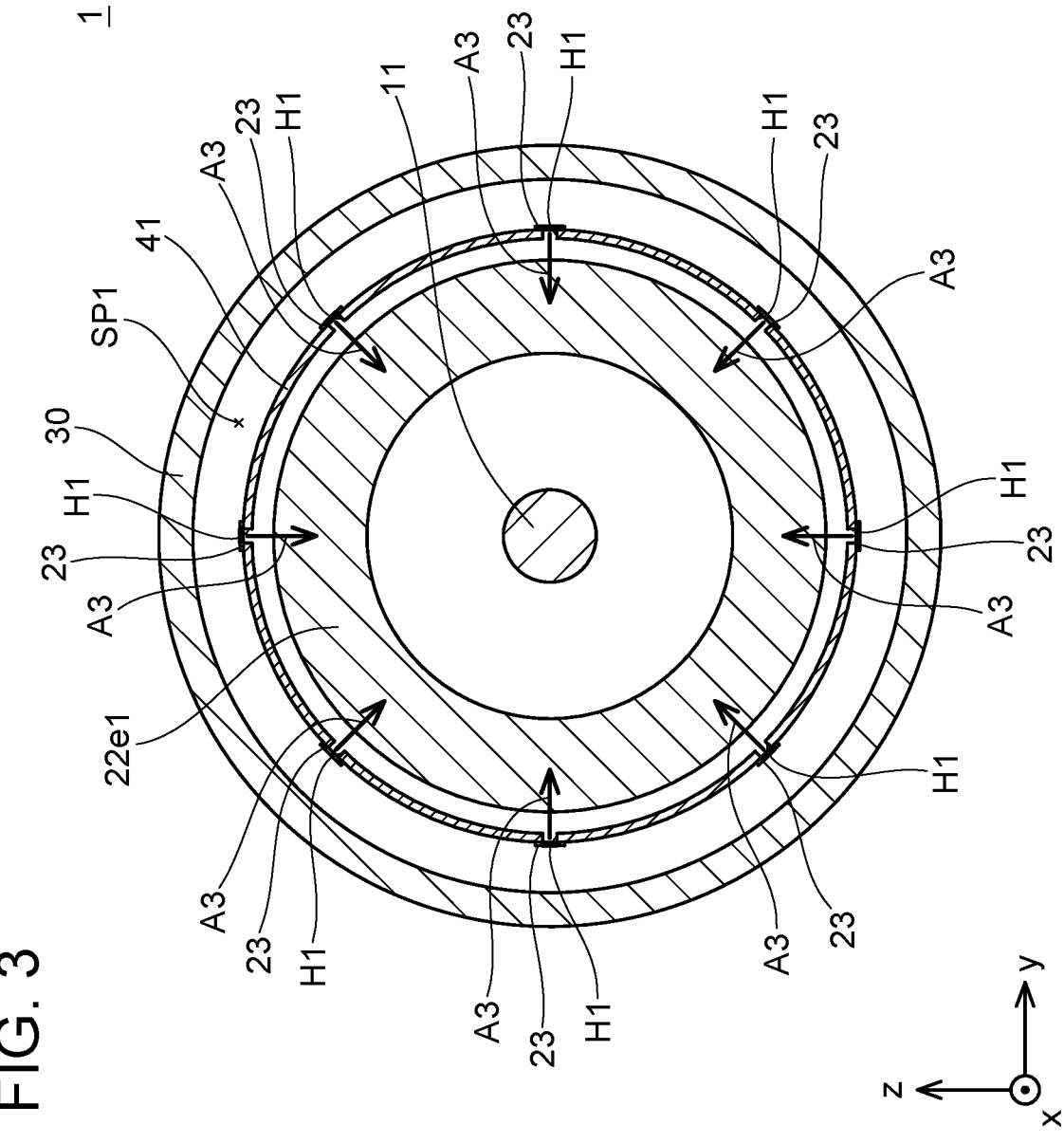
FIG. 3 is a schematic cross-sectional view along a line in FIG. 1.

The first annular member 41 comprises a plurality of first holes H1. Cooling oil is injected toward the first coil end 22$e$1 through the first holes H1. Referring to FIG. 3, the plurality of first holes H1 is described. FIG. 3 shows a schematic cross-sectional view along a line III-III in FIG. 1. FIG. 3 shows a cross-sectional view passing the centers of the first holes H1. The plurality of first holes H1 penetrates the first annular member 41 in its thickness direction. As shown in FIG. 3, the first holes H1 are equally spaced apart from each other on a circumference. In the present embodiment, there are eight first holes H1.

Figure 4:
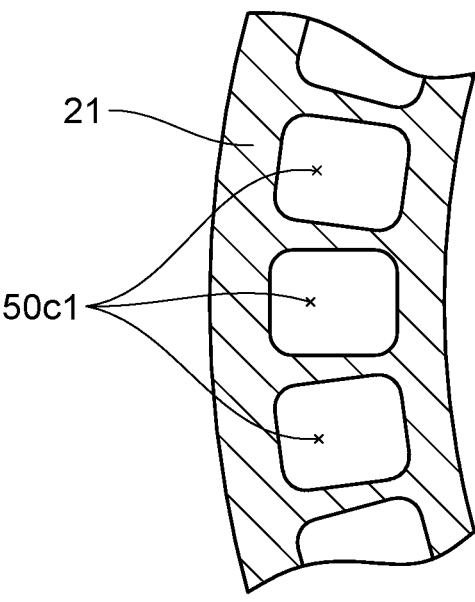
FIG. 4 is a partially enlarged view of a cross section along a line IV-IV in FIG. 2.
Figure 4:
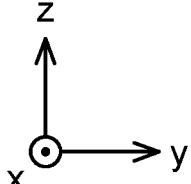
Figure 5:
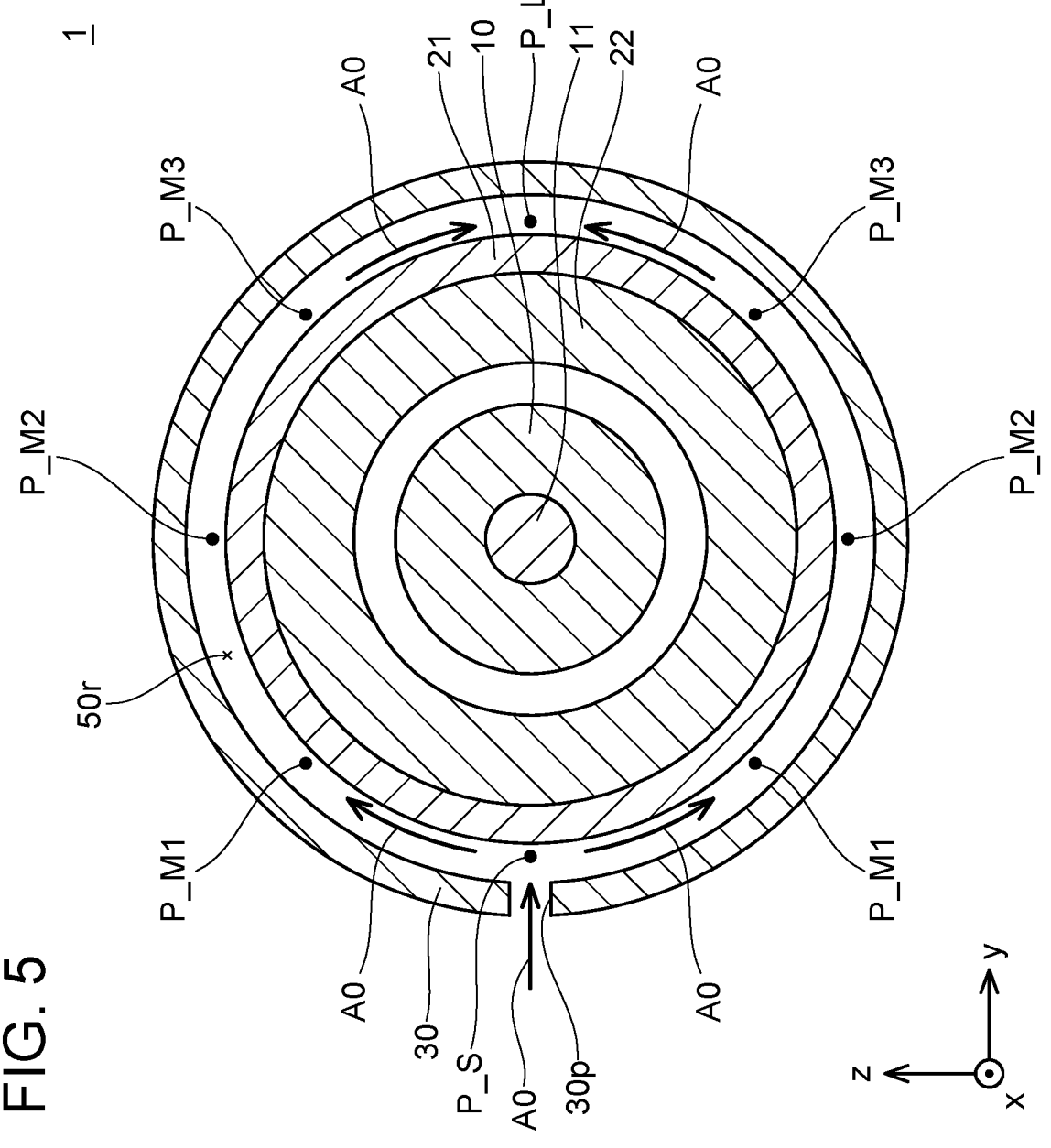
FIG. 5 is a schematic cross-sectional view along a line V-V lying on a center plane CP in FIG. 1.

Referring to FIGS. 1, 2, 4, and 5, the stator core 21 is described. FIG. 4 shows a partially enlarged view of a cross section along a line IV-IV in FIG. 2. FIG. 5 shows a schematic cross-sectional view along a line V-V lying on the center plane CP in FIG. 1. The stator core 21 is a cylindrical member. As shown in FIG. 2, the stator core 21 comprises an annular channel 50$r$, first channels 50$c$1, and second channels 50$c$2.

As shown in FIG. 5, the annular channel 50$r$ is a groove defined in the stator core 21 to extend over the entire circumference thereof. The annular channel 50$r$ is open upward. This opening is covered by the inner wall surface 30$w$, which defines a flow path. The annular channel 50$r$ is in communication with the supply port 30$p$ of the housing 30.

As shown in FIGS. 2 and 4, the first channels 50$c$1 are tunnel-shaped flow paths defined in an outer circumferential surface of the stator core 21. In FIG. 2, the plurality of first channels 50$c$1 and the plurality of second channels 50$c$2 are represented by broken lines. The plurality of first channels 50$c$1 extends from the annular channel 50$r$ up to the first end face 21$e$1, which is oriented in +x-direction. The first channels 50$c$1 extend parallel to each other and are equally spaced apart from each other in the circumferential direction. The plurality of second channels 50$c$2 has the same configuration as that of the plurality of first channels 50$c$1. The plurality of second channels 50$c$2 extends from the annular channel 50$r$ up to the second end face 21$e$2, which is oriented in −x-direction.

Referring to FIGS. 1 to 3, a plurality of mesh filters 23 is described. Each of the plurality of mesh filters 23 covers a corresponding one of the plurality of first holes H1. The mesh filters 23 all have the same structure. Therefore, the following description focuses on one mesh filter 23.

Figure 6:
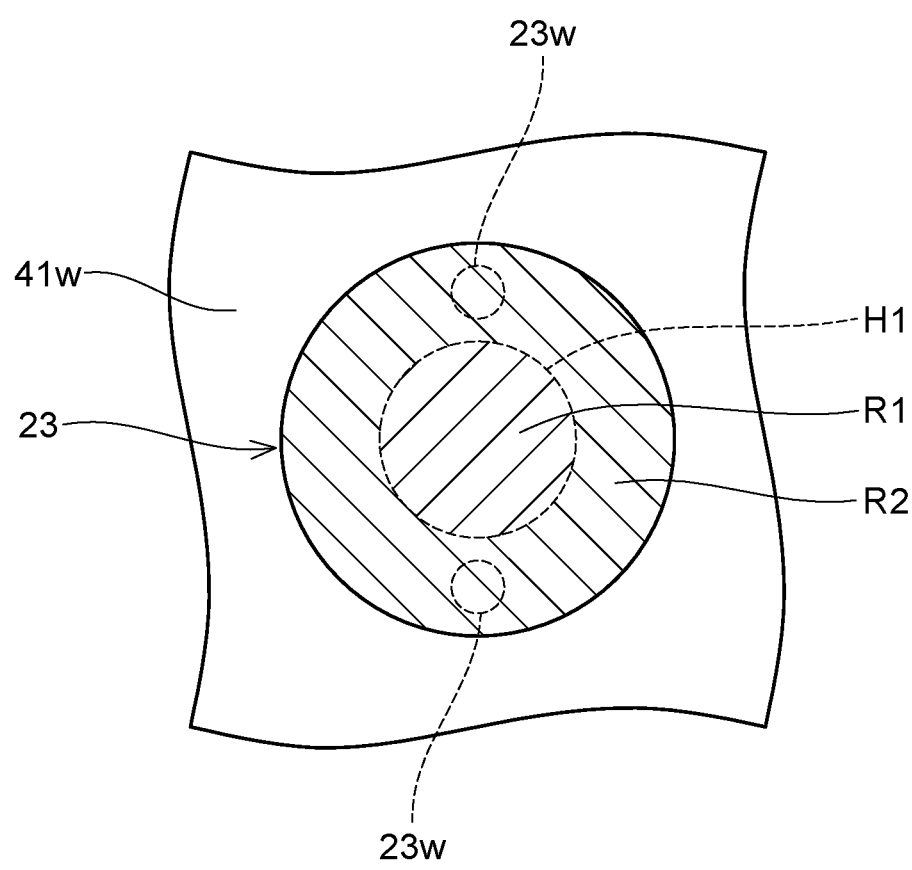
FIG. 6 is a top view of a mesh filter 23.

FIG. 6 shows a top view of a mesh filter 23. In FIG. 6, detailed depiction for the mesh is omitted. In FIG. 6, a first hole H1 beneath the mesh filter 23 is represented by a broken line. The opening of the first hole H1 has a circular shape. The mesh filter 23 has a circular shape that has a larger diameter than that of the first hole H1. The mesh filter 23 is arranged to cover the entire opening of the first hole H1.

The mesh filter 23 comprises a first region R1 and a second region R2. In FIG. 6, the first region R1 and the second region R2 are hatched in different patterns for the sake of clarity. The first region R1 covers the first hole H1. The second region R2 is adjacent to the first region R1. The second region R2 is in contact with an outer circumferential surface 41$w$ of the first annular member 41. The outer circumferential surface 41$w$ of the first annular member 41 faces the inner wall surface 30$w$ of the housing 30. Pores may be formed over the entire mesh filter 23 or only within the first region R1. Foreign matters can be captured by the first region R1. The mesh filter 23 can be secured to the first annular member 41 by the second region R2.

The second region R2 of the mesh filter 23 comprises welded portions 23$w$. The welded portions 23$w$ are portions of the second region R2 that are welded to the outer circumferential surface 41$w$ of the first annular member 41. In FIG. 6, the welded portions 23$w$ are represented by broken lines. An employed method of welding is not limited to a particular method. For example, as shown in FIG. 6, the second region R2 may be spot welded. Alternatively, the entire second region R2 may be welded so as to surround the periphery of the first hole H1. Displacement of the mesh filter 23 can be prevented by the welding. As will be described later, when the cooling oil is injected, the entire second region R2 is brought into a tight contact with the outer circumferential surface 41$w$ by the pressure of the cooling oil. Therefore, even in case of the spot welding, sealability of the mesh filter 23 can be ensured and leakage from the filter can be prevented.

The size of pores formed in the mesh filter 23 is described. The coil 22 comprises coil wires, which are not shown. Outer surfaces of the coil wires are coated with insulating films. An average diameter of the pores in the mesh filter 23 is smaller than an average thickness of the insulating films.

The mesh filter 23 may be constituted of any material. For example, a metal or any kind of resin may be used as a material of the mesh filter 23. Further, the mesh filter 23 may have any configuration. For example, an etched filter or a woven filter may be used as the mesh filter 23. In the present embodiment, the mesh filter 23 is a metal-etched filter.

The structure on +x-direction side relative to the center plane CP has been mainly described above. The structure on −x-direction side relative to the center plane CP is similar to that on +x-direction side. That is, there is a second annular member 42 that provides a seal between the second end face 21$e$2 of the stator core 21 and the inner wall surface 30$w$ of the housing 30. A space SP2 is defined between the second annular member 42 and the inner wall surface 30$w$. The second annular member 42 comprises a plurality of second holes H2. The cooling oil is injected toward the second coil end 22$e$2 through the plurality of second holes H2. Each of the plurality of second holes H2 is covered with a corresponding one of the mesh filters 23. Further description on the structure on −x-direction side relative to the center plane CP is omitted herein.

Operation

How the motor 1 operates is described. The cooling oil in the cooling oil reservoir flows through a pump and a supply pipe, which are not shown, and then flows into the supply port 30$p$ of the housing 30. The cooling oil supplied through the supply port 30$p$ flows into the annular channel 50$r$. This cooling oil flows within the annular channel 50$r$ in the circumferential direction (see arrows A0 in FIGS. 2 and 5). Then, the cooling oil flows into each of the plurality of first channels 50$c$1 and flows in +x-direction (see arrows A1 in FIG. 2). The cooling oil also flows into each of the plurality of second channels 50$c$2 and flows in −x-direction (see arrows A2 in FIG. 2). Once reaching +x-direction ends of the first channels 50$c$1, the cooling oil is discharged into the space SP1 and reaches the first annular member 41. Similarly, once reaching −x-direction ends of the second channels 50$c$2, the cooling oil is discharged into the space SP2 and reaches the second annular member 42.

Referring to FIG. 3, how the cooling oil is injected is described. Since the space SP1 is completely filled with the cooling oil, the cooling oil is pressured. The mesh filters 23 are pressed against the outer circumferential surface 41*w* of the first annular member 41 by the pressure of the cooling oil. The cooling oil flows through the first regions R1 (see FIG. 6) of the mesh filters 23 and is injected toward the first coil end 22*e*1 from the respective first holes H1 (see arrows A3).

Effects

There is an oil circulation path extending from the cooling oil reservoir up to the first annular member 41 via the pump, the supply pipe, the supply port 30*p*, the annular channel 50*r*, and the first channels 50*c*1. A foreign matter, such as a small burr made in a manufacturing process, may enter this oil circulation path. Together with the cooling oil, such a foreign matter flows up to the first annular member 41 and then is injected toward the first coil end 22*e*1 from a first hole H1. If this foreign matter reaches the coil wires, short-circuit may occur between coil wires via the foreign matter, which may result in an insulation failure. This is problematic especially because it is difficult to completely remove foreign matters, which are produced in the course of manufacturing, from the oil circulation path. In view of this, the technology according to the present embodiment comprises the mesh filters 23 to capture foreign matters in the cooling oil. It is thus possible to prevent foreign matters from reaching the first coil end 22*e*1. Further, since the mesh filters 23 are disposed at the first holes H1 which are located immediately close to the coil wires, foreign matters can be surely captured. Therefore, the occurrence of an insulation failure at the coil wires due to foreign matters can be suppressed.

The insulating films of the coil wires may be physically damaged by foreign matters adhering to the coil wire surfaces. If this damage is severe, the foreign matters may penetrate the insulating films and reach a conductor, which may cause short-circuit between coil wires. In view of this, in the technology according to the present embodiment, the average diameter of pores formed in the mesh filters 23 is smaller than the average thickness of the insulating films coating the coil wires. This allows only foreign matters that have diameters smaller than the average thickness of the insulating films to pass through the mesh filters 23. Since damage to the insulating films caused by foreign matters can thereby be suppressed, it is possible to prevent the occurrence of an event in which foreign matters penetrate the insulating films and reach the conductor. The occurrence of an insulation failure due to foreign matters can be suppressed.

Second Embodiment

Configuration of Annular Mesh Filter 223

Figure 7:
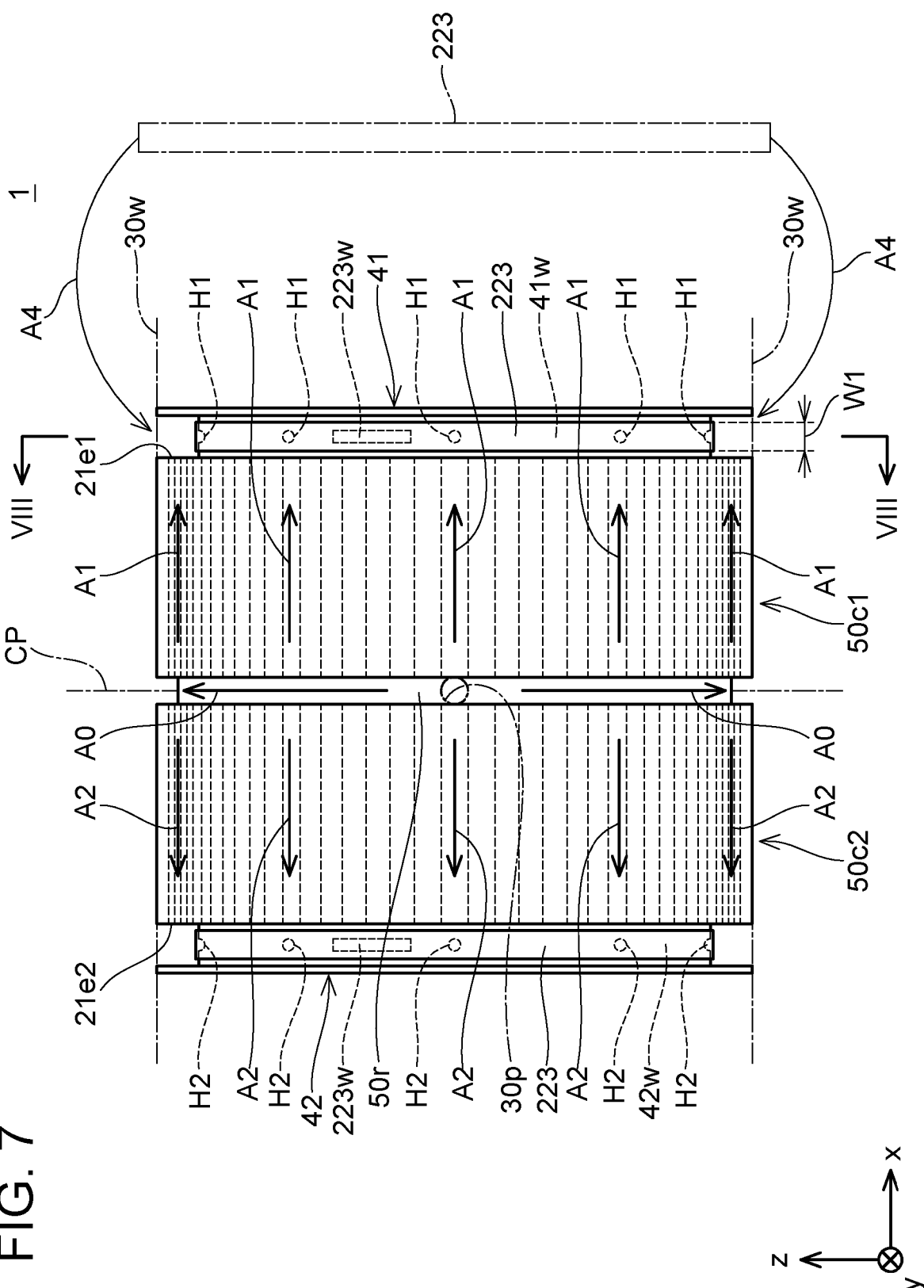
FIG. 7 is a side view of the motor 1.
Figure 8:
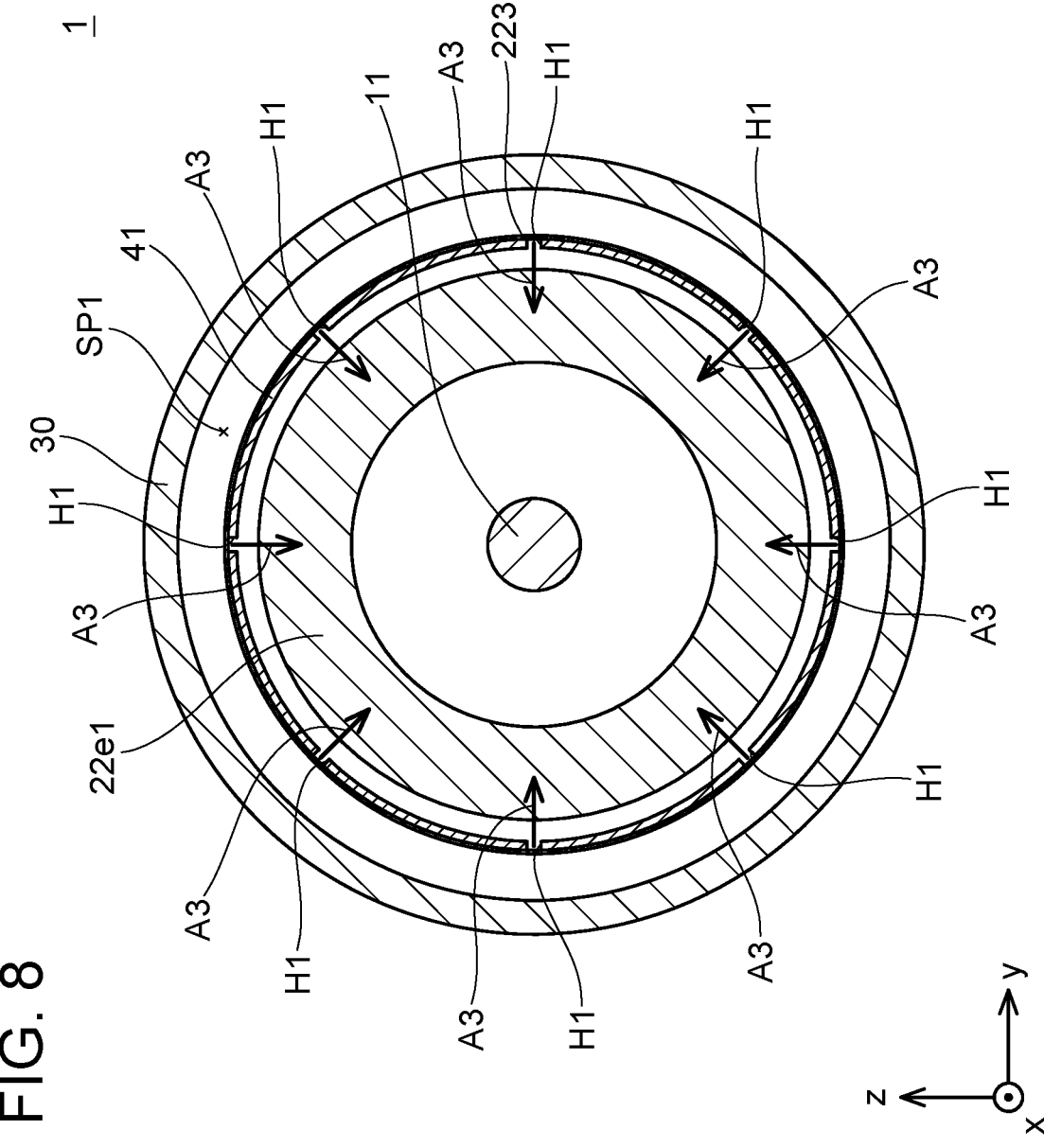
FIG. 8 is a schematic cross-sectional view of the motor 1.

A second embodiment is different than the first embodiment in a configuration of an annual mesh filter 223. Configurations same as those described in connection to the first embodiment are labeled with the same reference signs, and description for them is omitted. FIGS. 7 and 8 show a side view and a schematic cross-sectional view of a motor 1 according to the second embodiment. FIGS. 7 and 8 show views corresponding to the views in FIGS. 2 and 3 of the first embodiment.

The annual mesh filter 223 extends along the outer circumferential surface 41*w* of the first annular member 41 and covers the plurality of first holes H1. A width W1 of the annual mesh filter 223 in the axial direction is greater than the diameter of the first holes H1. The annular mesh filter 223 is arranged to cover the entire openings of the first holes H1. The annular mesh filter 223 comprises first regions R1 and a second region R2. These regions have been described in connection with the first embodiment. The second region R2 of the annual mesh filter 223 comprises one or more welded portions 223*w* at at least a part thereof. Each welded portion 223*w* is a portion welded to the outer circumferential surface 41*w*. In FIG. 7, each welded portion 223*w*, which is spot welded, is represented by a broken line. The annular mesh filter 223 is secured to the first annular member 41 by the one or more welded portions 223*w*.

The annular mesh filter 223 is radially expandable and contractible. As indicated by an imaginary line (dashed-and-dotted line) in FIG. 7, the annular mesh filter 223 can be elastically deformed such that its diameter is increased. Thus, as indicated by an arrow A4, the annular mesh filter 223 can be placed on the outer circumferential surface 41*w* of the first annular member 41. In this way, the annular mesh filter 223 can be easily arranged along the outer circumferential surface 41*w*.

All the other features of the mesh filters 23 described in connection with the first embodiment, such as the average diameter of pores, are applicable to the annular mesh filter 223 according to the second embodiment.

Effects

All the first holes H1 are covered with a single annular mesh filter 223. Thus, the mesh filter configuration can be simplified as compared to a case in which individual mesh filters are provided for respective first holes H1.

Third Embodiment

Figure 9:
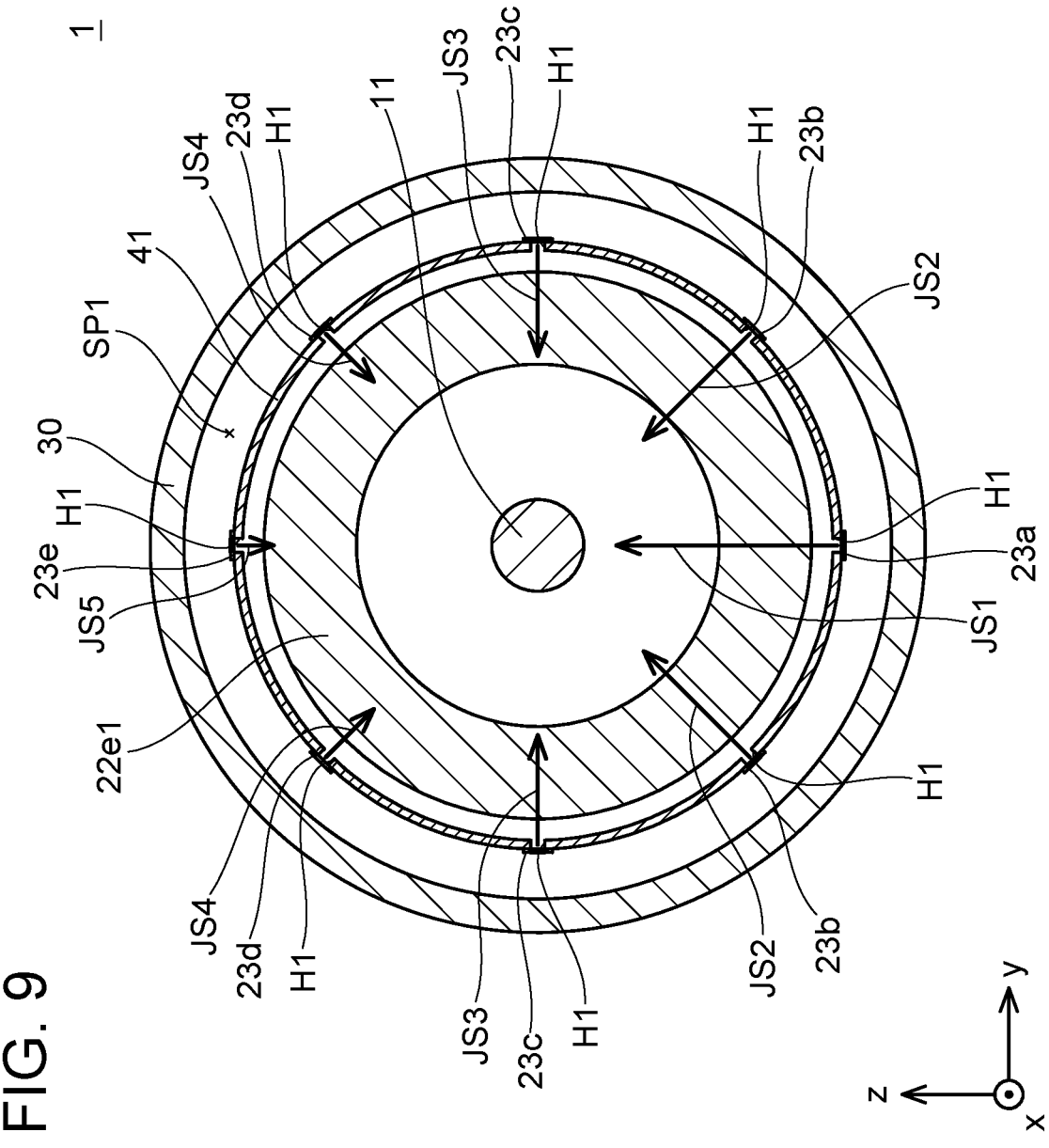
FIG. 9 is a schematic cross-sectional view of the motor 1.

A third embodiment is different than the first embodiment in that the mesh filters 23 have different average pore diameters. Configurations same as those described in connection with the first embodiment are labeled with the same reference signs, and description for them is omitted. FIG. 9 shows a schematic cross-sectional view of a motor 1 according to the third embodiment. The cross-sectional view in FIG. 9 corresponds to the cross-sectional view in FIG. 3 of the first embodiment. In FIG. 9, how the cooling oil is injected is indicated by injection vectors JS1 to JS5. Longer vectors indicate larger injection amounts.

The plurality of mesh filters 23 comprises mesh filters 23*a* to 23*e*. In the vertical direction, the mesh filters 23*b* are positioned above the mesh filter 23*a*, the mesh filters 23*c* are positioned above the mesh filters 23*b*, the mesh filters 23*d* are positioned above the mesh filters 23*c*, and the mesh filter 23*e* is positioned above the mesh filters 23*d*. That is, the mesh filter 23*a* is the lowermost mesh filter and the mesh filter 23*e* is the uppermost mesh filter. From the mesh filter 23*a* toward the mesh filter 23*e*, the average pore diameter gradually decreases. Thus, a filtration resistance of the mesh filters 23*b* is higher than that of the mesh filter 23*a*, a filtration resistance of the mesh filters 23*c* is higher than that of the mesh filters 23*b*, a filtration resistance of the mesh filters 23*d* is higher than that of the mesh filters 23*c*, and a filtration resistance of the mesh filter 23*e* is higher than that of the mesh filters 23*d*. That is, the mesh filter 23*a* has the lowest filtration resistance and the mesh filter 23*e* has the highest filtration resistance.

Figure 10:
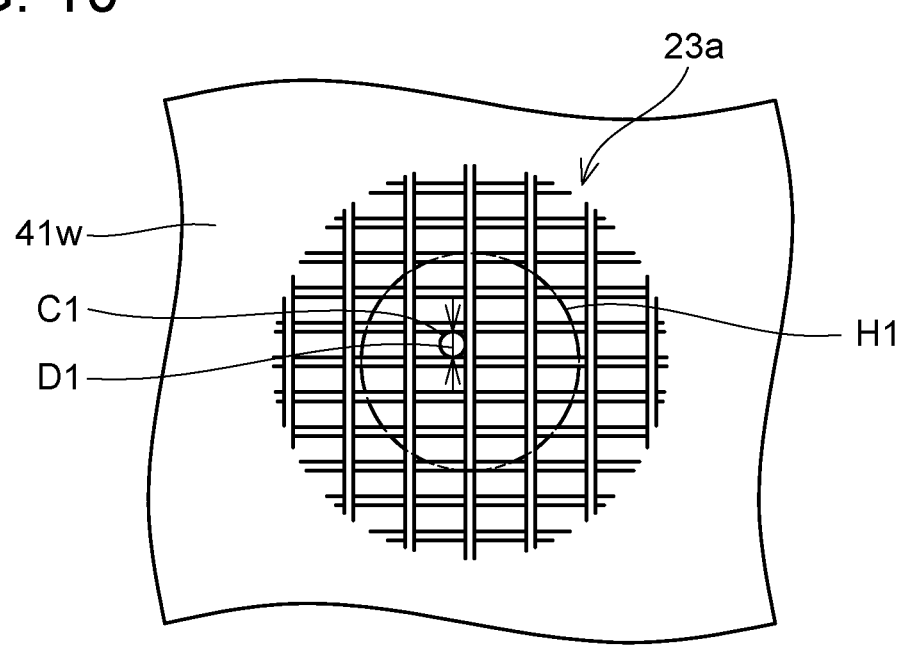
Figure 11:
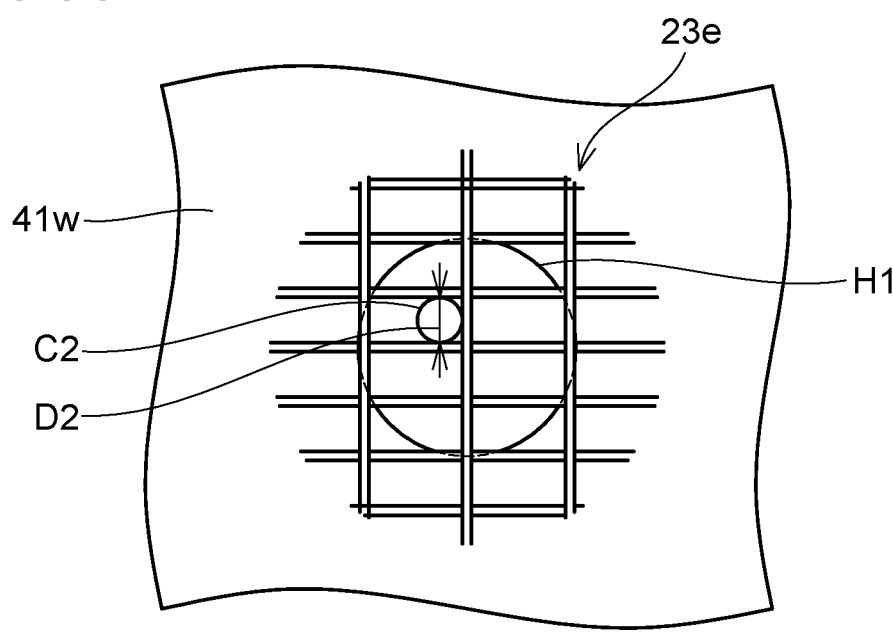
FIG. 11 is a top view of a mesh filter 23e.

FIGS. 10 and 11 show schematic top views of the mesh filters 23*a* and 23*e*, respectively. FIGS. 10 and 11 correspond to FIG. 6. The mesh filters 23*a* and 23*e* are woven filters. The pore diameter herein means the diameter of an inscribed circle that is tangent to at least three sides of a cell of a mesh filter. As shown in FIG. 10, the mesh filter 23*a* has a first inscribed circle C1 and a first average pore diameter D1. As shown in FIG. 11, the mesh filter 23e has a second inscribed circle C2 and a second average pore diameter D2. The first average pore diameter D1 is larger than the second average pore diameter D2.

A given pressure is applied to each of the mesh filters 23a to 23e by the cooling oil. Thus, larger amounts of cooling oil flow through mesh filters with lower filtration resistances. Therefore, the injection amount decreases as indicated by the injection vectors JS1 to JS5.

Effects

The cooling oil injected through a first hole H1 positioned lower in the vertical direction has a larger injection component in the opposite direction to the gravity direction, as compared to the cooling oil injected through a first hole H1 positioned above that lower first hole. Therefore, a sufficient cooling effect for the first coil end 22e1 may not be obtained at the lower first hole H1. In the technology according to the present embodiment, mesh filters positioned lower in the vertical direction have larger average pore diameters. That is, larger amounts of cooling oil are injected through first holes H1 positioned lower in the vertical direction. Therefore, a sufficient cooling effect can be ensured even at lower first holes.

Fourth Embodiment

Figure 12:
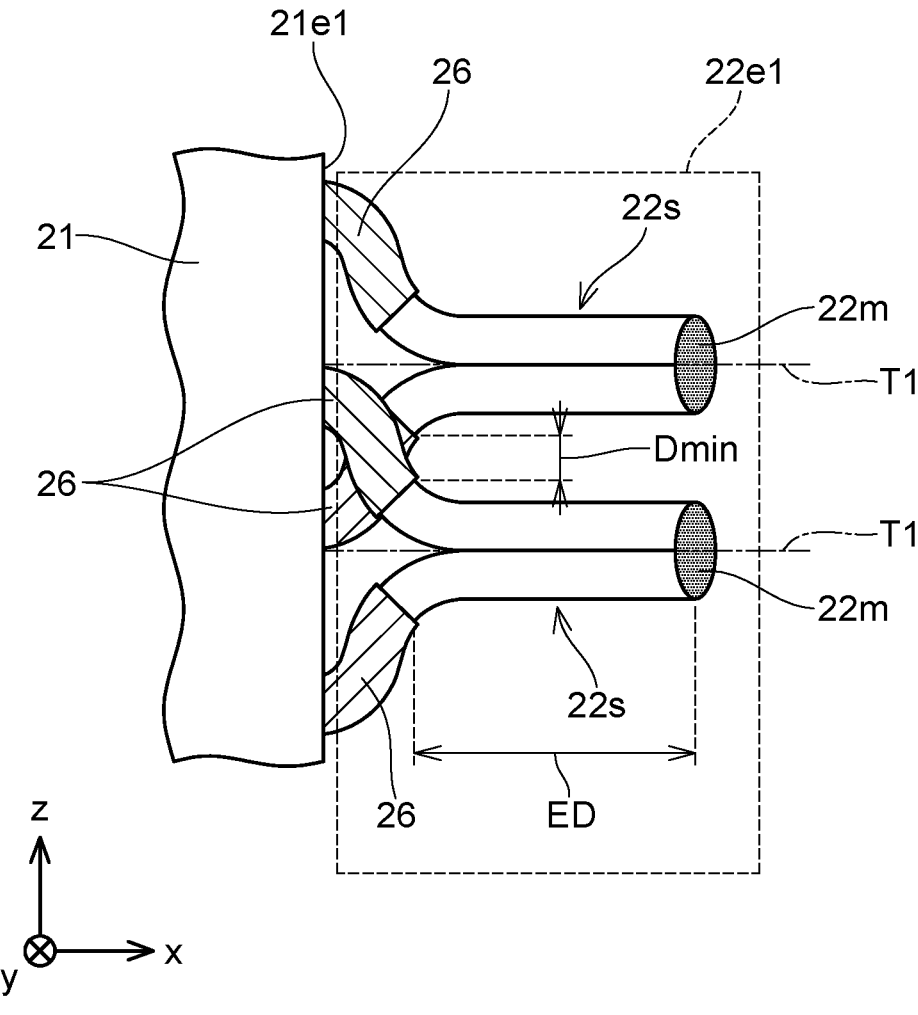
FIG. 12 is a schematic cross-sectional view of the motor 1.

A fourth embodiment is different than the first embodiment in how the average pore diameter of mesh filters 23 is determined. Configurations same as those described in connection with the first embodiment are labeled with the same reference signs, and description for them is omitted. FIG. 12 shows a schematic side view of a motor 1 according to the fourth embodiment. FIG. 12 shows an enlarged view in the vicinity of the first end face 21e1 of the stator core 21 and the first coil end 22e1. In FIG. 12, the depiction of the first annular member 41 is omitted for the sake of clarity and insulating films 26 are hatched.

The coil 22 comprises a plurality of segment coils 22s. In FIG. 12, only a few of the segment coils 22s are shown. Outer surfaces of the segment coils 22s are coated with insulating films 26. End portions ED of the segment coils 22s are located at the first coil end 22e1. The end portions ED are exposed from the insulating films 26. As shown in FIG. 12, ends of the end portions ED of a pair of segment coils 22s are welded with the end portions ED being in contact with each other at a mating face Ti. Thus, welding marks 22m are formed at the ends of the end portions ED.

The end portions ED are air-insulated. Further, a minimum distance Dmin is provided between the end portions ED. The average pore diameter of the mesh filters 23 is smaller than the minimum distance Dmin.

Effects

If the end portions ED of the segment coils 22s contact each other via a foreign matter, short-circuit may thereby be caused. In view of this, the technology according to the present embodiment allows only foreign matters that have diameters smaller than the minimum distance Dmin to pass through the mesh filters. Therefore, the occurrence of short-circuit due to foreign matters can be suppressed.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

Modifications

The shape of the openings of the first and second holes is not limited to circle but may be various other shapes. Further, the number and arrangement of the first and second holes are not limited to those described herein but may be different.

In the first embodiment, the shape of the mesh filters 23 is not limited to circle but may be various other shapes. Further, the shape of the mesh filters 23 may be different from the shape of the openings of the first holes H1.

The mesh filters 23 and the annular mesh filter 223 may be arranged in various ways. For example, insert molding may be used in which the mesh filters 23 or the annular mesh filter 223 is placed on a mold first, and then a resin is injected around it.

The average pore diameter of the mesh filters 23 may vary in different manners than the manner described in connection with the third embodiment. For example, mesh filters positioned lower in the vertical direction may have smaller average pore diameters.

In the annular mesh filter 223, the average pore diameter may vary at different portions. This allows the injection amount of cooling oil to be appropriately adjusted at the respective first holes H1.

Not all of the first holes H1 may be covered with the mesh filters. Only one or some of the first holes H1 may be covered with the mesh filters.

What is claimed is:

1. A motor comprising:
   a rotor;
   a stator comprising a stator core and a coil;
   a housing that houses the rotor and the stator; and
   a first annular member that provides a seal between a first end face of the stator core in an axial direction of the stator core and an inner wall surface of the housing, wherein
   the first annular member comprises a plurality of first holes through which refrigerant is injected toward a first coil end of the coil protruding from the first end face of the stator core,
   at least one of the plurality of first holes is covered with at least one mesh filter,
   the at least one mesh filter includes a first mesh filter in which an average diameter of pores is a first average pore diameter and a second mesh filter in which an average diameter of pores is a second average pore diameter,
   the first average pore diameter is larger than the second average pore diameter, and
   the at least one of the plurality of first holes includes a first hole covered only with the first mesh filter and an other first hole covered only with the second mesh filter.

2. The motor according to claim 1, wherein
   the at least one mesh filter comprises a plurality of mesh filters, and
   each of the plurality of mesh filters covers a corresponding one of the plurality of first holes.

3. The motor according to claim 2, wherein
   the first annular member comprises an outer circumferential surface facing the inner wall surface of the housing, and each mesh filter comprises:

a first region covering the first hole; and a second region adjacent to the first region and in contact with the outer circumferential surface of the first annular member.

4. The motor according to claim 3, wherein the first annular member includes a resin, and the second region of the mesh filter includes a welded portion welded to the outer circumferential surface of the first annular member.

5. The motor according to claim 1, wherein the first annular member has a cylindrical shape about an axis of the stator core and includes an outer circumferential surface facing the inner wall surface of the housing, and the at least one mesh filter includes an annular mesh filter covering the plurality of the first holes and extending along the outer circumferential surface of the first annular member.

6. The motor according to claim 5, wherein the annular mesh filter is constituted of a metal, and is expandable and contractible in a radial direction of the annular mesh filter.

7. The motor according to claim 5, wherein the first annular member includes a resin, and the annular mesh filter comprises a welded portion welded to the outer circumferential surface of the first annular member.

8. The motor according to claim 1, wherein the coil comprises a coil wire, an outer surface of the coil wire being coated with an insulating film, and an average diameter of pores formed in the at least one mesh filter is smaller than an average thickness of the insulating film.

9. The motor according to claim 1, wherein the coil comprises a plurality of segment coils, outer surfaces of the segment coils being coated with insulating films, at the first coil end, ends of the plurality of segment coils are each exposed from the insulating films, and an average diameter of pores formed in the at least one mesh filter is smaller than a minimum distance between the ends of the plurality of segment coils.

10. The motor according to claim 1, wherein the first mesh filter is positioned below the second mesh filter in a direction orthogonal to a rotation shaft of the motor and along a direction of gravity.

11. The motor according to claim 1, wherein the motor further comprises a second annular member that provides a seal between a second end face of the stator core and the inner wall surface of the housing, the second end face being opposite to the first end face of the stator core in the axial direction, the second annular member comprises a plurality of second holes through which the refrigerant is injected toward a second coil end of the coil protruding from the second end face of the stator core, and at least one of the plurality of second holes is covered with at least one mesh filter.

\* \* \* \* \*